(12) United States Patent
Doepker et al.

(10) Patent No.: US 7,435,067 B2
(45) Date of Patent: Oct. 14, 2008

(54) SCROLL MACHINE WITH BRUSHLESS PERMANENT MAGNET MOTOR

(75) Inventors: Roy J. Doepker, Lima, OH (US); John P Elson, Sidney, OH (US); William E Ramey, Sidney, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 309 days.

(21) Appl. No.: 11/016,526

(22) Filed: Dec. 17, 2004

(65) Prior Publication Data
US 2006/0133944 A1 Jun. 22, 2006

(51) Int. Cl.
*F01C 21/00* (2006.01)
*F03C 2/00* (2006.01)

(52) U.S. Cl. ............... 418/151; 418/55.1; 418/55.5; 418/57; 417/410.5; 417/902

(58) Field of Classification Search ....... 418/55.1–55.6, 418/57, 94, 151; 310/10, 51, 156.01, 156.54, 310/266, 261; 74/573 R; 417/410.5, 902
See application file for complete search history.

(56) References Cited

U.S. PATENT DOCUMENTS

| | | | |
|---|---|---|---|
| 3,644,767 A | | 2/1972 | Kasargod et al. |
| 4,592,703 A | * | 6/1986 | Inaba et al. ............ 417/902 |
| 5,282,309 A | * | 2/1994 | La Rue ............... 29/736 |
| 5,386,163 A | * | 1/1995 | Heilman ............... 310/51 |
| 5,580,230 A | * | 12/1996 | Keifer et al. ........... 418/55.5 |
| 5,951,269 A | * | 9/1999 | Sasa et al. ............. 418/55.1 |
| 6,174,150 B1 | * | 1/2001 | Tsubono et al. ......... 418/55.5 |
| 6,540,489 B1 | | 4/2003 | Higashiyama |

FOREIGN PATENT DOCUMENTS

| | | | |
|---|---|---|---|
| EP | 1209361 | | 5/2002 |
| JP | 61231858 | | 10/1986 |
| JP | 04252801 A | * | 9/1992 |
| JP | 08277787 A | * | 10/1996 |
| JP | 09289747 | | 11/1997 |
| WO | WO 2005/040610 | | 5/2005 |

OTHER PUBLICATIONS

European Search Report for European Patent Application No. EP05256975, dated Mar. 21, 2007 (2 pages).

* cited by examiner

*Primary Examiner*—Theresa Trieu
(74) *Attorney, Agent, or Firm*—Harness, Dickey & Pierce, P.L.C.

(57) ABSTRACT

A scroll machine is powered by a brushless permanent magnet motor. The rotor for the motor includes a rotor body formed by a plurality of laminations and an upper and lower counterweight made of zinc and located at opposite ends of the rotor body. An attachment member extends through the counterweights and the rotor body to secure the counterweights and the plurality of laminations. The counterweights include steel inserts which cooperate with the attachment member to provide a metal to metal clamping for the rotor body with a steel connection being maintained through the rotor.

28 Claims, 4 Drawing Sheets

SCROLL MACHINE WITH BRUSHLESS PERMANENT MAGNET MOTOR

FIELD OF THE INVENTION

The present invention relates to a scroll machine having a brushless permanent magnet motor. More particularly, the present invention relates to a system for incorporating upper and lower counterweights into a scroll machine which utilizes a brushless permanent magnet motor.

BACKGROUND AND SUMMARY OF THE INVENTION

For exemplary purposes, the system for incorporating upper and lower counterweights of the present invention will be described in association with a scroll machine. It is to be understood that it is within the scope of the present invention to utilize the system of the present invention with any device which includes a brushless permanent magnet motor and which requires counterweights.

A class of machines exists in the art generally known as "scroll" machines for the displacement of various types of fluids. Such machines may be configured as an expander, a displacement engine, a pump, a compressor, etc., and many features of the present invention are applicable to any one of these machines. For purposes of illustration, however, the disclosed embodiments of the present invention are in the form of a hermetic refrigerant compressor powered by a brushless permanent magnet motor.

Generally speaking, a scroll machine comprises two spiral scroll wraps of similar configuration, each mounted on a separate end plate to define a scroll member. The two scroll members are interfitted together with one of the scroll wraps being rotationally displaced 180° from the other. The machine operates by orbiting one scroll member (the "orbiting scroll") with respect to the other scroll member (the "fixed scroll" or "non-orbiting scroll") to make moving line contacts between the flank surfaces of the wraps, thereby defining moving isolated crescent-shaped pockets of fluid. The spirals are commonly formed as involutes of a circle, and ideally there is no relative rotation between the scroll members during operation; i.e., there is purely curvilinear translation (i.e., no rotation of any line in the body). The fluid pockets carry the fluid to be handled from a first zone in the scroll machine where a fluid inlet is provided, to a second zone in the machine where a fluid outlet is provided. The volume of the sealed pockets change as they move from the first zone to the second zone. At any one instant in time, there will be at least one pair of sealed pockets; and when there are several pairs of sealed pockets at once, each pair will have different volumes. In a compressor, the second zone is at a higher pressure than the first zone and it is physically located centrally in the machine, the first zone being located at the outer periphery of the machine.

Two types of contacts define the fluid pockets formed between the scroll members. First, axially extending tangential line contacts are formed between the spiral faces of flanks of the scroll wraps. These tangential line contacts are caused by radial forces (flank sealing). Second, area contacts are formed between the plane edge surfaces (the "tips") of each wrap and the opposite end plate ("tip sealing"). These area contacts are caused by axial forces. For high efficiency, good sealing must be achieved for both types of contacts.

The concept of a scroll-apparatus has, thus, been known for some time and has been recognized as having distinct advantages. For example, scroll machines have high isentropic and volumetric efficiency, and, hence, are relatively small and lightweight for a given capacity. They are quieter and more vibration-free than many compressors because they do not use large reciprocating parts (e.g., pistons, connecting rods, etc.) and because all fluid flows in one direction with simultaneous compression in plural opposed pockets, there are less pressure-created vibrations. Such machines also tend to have high reliability and durability because of the relatively few moving parts utilized, the relatively low velocity of movement between the scrolls, and an inherent forgiveness to fluid contamination.

The orbiting of one scroll member with respect to the other scroll member creates an imbalance which is typically counteracted using one or more counterweights. When a scroll machine is powered by an induction motor, the induction motor includes a rotor which is at least partially manufactured from cast aluminum. The cast aluminum portion of the rotor includes bars and end rings which allow for the prior art method used for attaching the counterweights. An upper counterweight is typically attached to the top end of the rotor to balance the scroll mass. A lower counterweight is typically attached to the lower end of the rotor to balance the moment mass.

On induction motors, the counterweights are typically attached to the rotor end rings by use of aluminum posts which are cast as part of the rotor. These cast posts extend through openings in the counterweights and the posts are swaged over to retain the counterweights on the rotor. Counterweights can also be pressed or bolted onto the rotating rotor or the drive shaft of the scroll machine. For reasons of low cost and minimal variation in the balancing mass, zinc die-cast counterweights have been the design of choice for comparable AC motor scroll compressors.

Brushless permanent magnet (BPM) motors have rotors that use permanent magnets which are unmagnetized and loose during assembly. BPM rotors typically do not include cast aluminum bars or end rings so counterweights cannot be swaged on as described above for the induction motor counterweights. The BPM rotor is made up of a stack of steel laminations with permanent magnets assembled in slots in the rotor stack. As noted above, the magnets are in an "unmagnetized" state during the assembly of the rotor. This structure is somewhat loose due to the fact that it does not have cast aluminum rotor bars and end rings to hold it together. Without the prior art rotor bars and end rings, it is necessary to develop a new method for attaching the counterweights to the rotor of a BPM motor.

The present invention provides a cost effective method for counterweight attachment, containment of the permanent magnets and clamping of the BPM rotor laminations. Upper and lower counterweights are cast from a non-magnetic material such as brass or zinc. The counterweights are cast with a thin base plate, approximately the same diameter as the laminations and with a protruding mass for balancing. Four steel inserts are cast within the counterweights to facilitate the assembly of the BPM rotor. There are two designs for the steel inserts, where one has a threaded interior hole and the other has a clearance hole. The threaded insert is used if the attachment bolt is inserted from the opposite side of the rotor and threadingly received by the insert. The clearance insert is used if the attachment bolt is inserted from the same side as the insert as detailed below. The rotor laminations contain four clearance holes for bolts and slots for the permanent magnets.

The rotor laminations, magnets and counterweights are first assembled into a sub-assembly. Two bolts are assembled through the insert having the clearance holes in the lower counterweight base plate, through the clearance holes in the laminations and then threaded into two inserts having the threaded holes in the upper counterweight. Two bolts are assembled through the insert having the clearance holes in the upper counterweight base plate, through the clearance holes in the laminations and then threaded into two inserts having the threaded holes in the lower counterweight. This subassembly can then be pressed onto the driveshaft of the BPM motor. While the rotor assembly has been described having two bolts being assembled in opposite directions, it is within the scope of the present invention to have all four bolts assembled in the same direction if desired. The incorporation of the steel inserts permits a metal to metal clamping for the rotor assembly with a steel connection being maintained through the assembly. This steel connection overcomes the problems associated with creeping of the prior art zinc counterweight.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The balancing system of the present invention is applicable to any type of rotary apparatus. For exemplary purposes only, the present invention is described in conjunction with a rotary compressor and, in particular, with a scroll-type refrigerant compressor.

Figure 1:
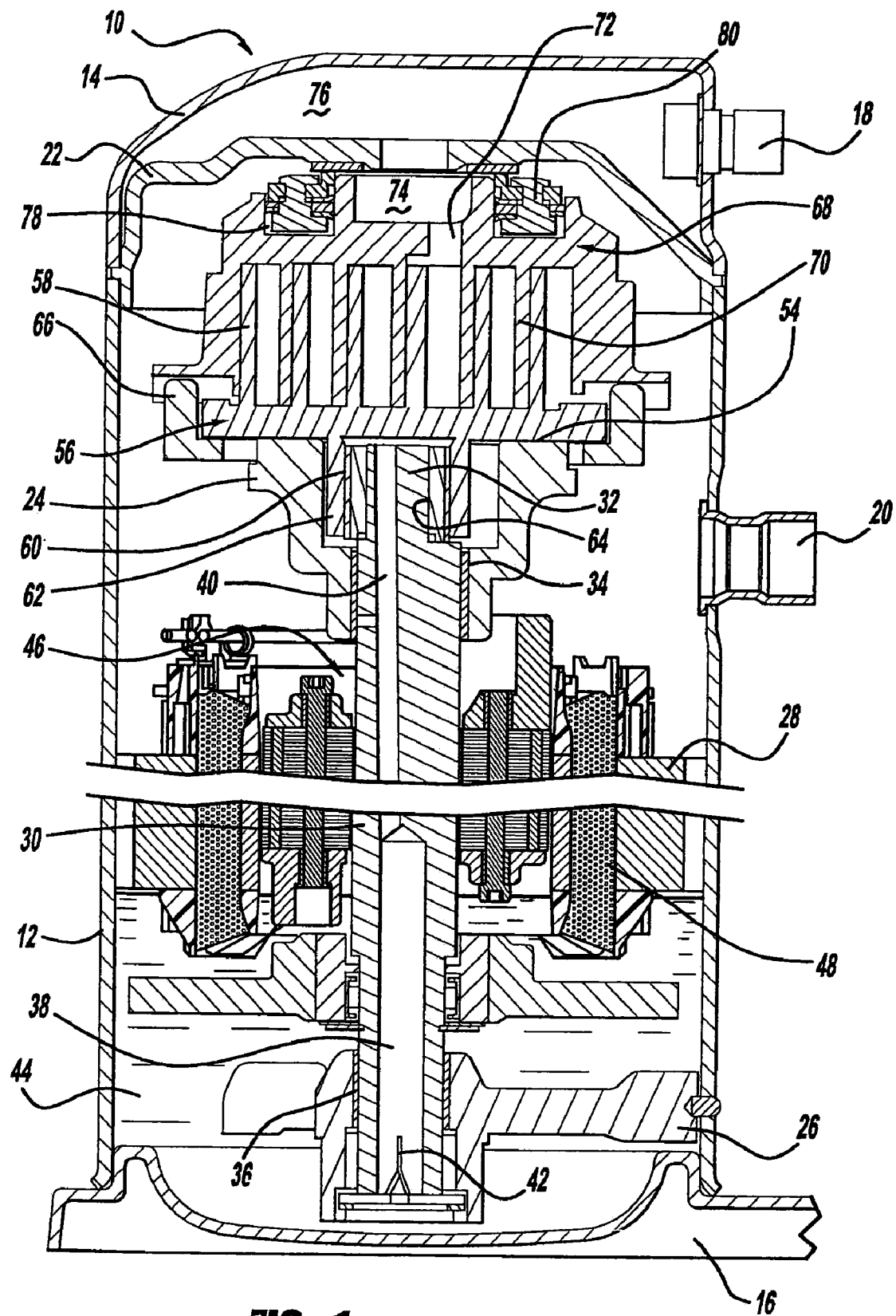
FIG. 1 is a vertical cross-sectional view through the center of a scroll-type refrigeration compressor incorporating the BPM motor in accordance with the present invention.

Referring now to the drawings in which like reference numerals designate like or corresponding parts throughout the several views, there is shown in FIG. 1 a scroll compressor which incorporates the balancing system in accordance with the present invention which is designated generally by reference numeral 10. Compressor 10 comprises a generally cylindrical hermetic shell 12 having welded at the upper end thereof a cap 14 and at the lower end thereof a base 16. Cap 14 is provided with a refrigerant discharge fitting 18, a suction fitting 20 and a partition 22 secure to both shell 12 and cap 14. Other major elements affixed to the shell include a main bearing housing 24 which is suitably secured to shell 12 and a lower bearing housing 26 also having a plurality of radially outwardly extending legs, each of which is also suitably secured to shell 12. A motor stator 28, which is generally a polygon in cross-section but with the corners rounded off, is press fitted into shell 12. The flats between the rounded corners on stator 28 provide passageways between stator 28 and shell 12, which facilitate the return flow of lubricant from the top of shell 12 to the bottom of shell 12.

A drive shaft or crankshaft 30 having an eccentric crank pin 32 at the upper end thereof is rotatably journaled in a bearing 34 in main bearing housing 24, and a second bearing 36 in lower bearing housing 26. Crankshaft 30 has at the lower end a relatively large diameter concentric bore 38 which communicates with a radially outwardly located smaller diameter bore 40 extending upwardly therefrom to the top crankshaft 30. Disposed within bore 38 is a stirrer 42. The lower portion of the interior of shell 12 defines an oil sump 44 which is filled with lubricating oil to a level slightly above the lower end of a rotor assembly 46. Bore 38 acts as a pump to pump lubricating fluid up the crankshaft 30 and into bore 40, and ultimately to all of the various portions of compressor 10 which require lubrication. While the present invention is illustrated using bore 38 and stirrer 42, it is within the scope of the present invention to utilize a two-stage oil pumping system or any other oil pumping system known in the art.

Crankshaft 30 is rotatively driven by a brushless permanent magnet (BPM) motor including stator 28, windings 48 passing therethrough and rotor assembly 46 press fitted on the crankshaft 30.

The upper surface of main bearing housing 24 is provided with a flat thrust bearing surface 54 on which is disposed an orbiting scroll member 56 having the usual spiral vane or wrap 58 on the upper surface thereof. Projecting downwardly from the lower surface of orbiting scroll member 56 is a cylindrical hub having a journal bearing 60 therein, and in which is rotatively disposed a drive bushing 64 having an inner bore in which crank pin 32 drivingly disposed. Crank pin 32 has a flat on one surface which drivingly engages a flat surface (not shown) formed in a portion of the inner bore of the drive bushing to provide a radially compliant driving arrangement, such as shown in U.S. Pat. No. 4,877,382, the disclosure of which is hereby incorporated herein by reference. An Oldham coupling 66 is also provided, positioned between orbiting scroll member 56 and main bearing housing 24, and keyed to orbiting scroll member 56 and a non-orbiting scroll member 68 to prevent rotational movement of orbiting scroll member 56. Oldham coupling 66 is preferably of the type disclosed in U.S. Pat. No. 5,320,506, the disclosure of which is hereby incorporated herein by reference.

Non-orbiting scroll member 68 is also provided, having a wrap 70 positioned in meshing engagement with wrap 58 of orbiting scroll member 56. Non-orbiting scroll member 68 has a centrally disposed discharge passage 72 which communicates with an upwardly open recess 74 which, in turn, is in fluid communication with a discharge chamber 76 and discharge fitting 18 attached to cap 14. An annular recess 78 is also formed in non-orbiting scroll member 68 within which is disposed a seal assembly 80. Recesses 74 and 78 and seal assembly 80 cooperate to define axial pressure biasing chambers which receive pressurized fluid being compressed by wraps 58 and 70 so as to exert an axial biasing force on non-orbiting scroll member 68 to thereby urge the tips of respective wraps 58, 70 into sealing engagement with the opposed end plate surfaces. Seal assembly 80 is preferably of the type described in greater detail in U.S. Pat. No. 5,156,539, the disclosure of which is hereby incorporated herein by reference. Seal assembly 80 engages partition 22 to seal discharge passage 72, recess 74, discharge chamber 76 and discharge fitting 18 from the suction pressure area of shell 12.

Non-orbiting scroll member 68 is designed to be mounted to main bearing housing 24 in a suitable manner such as disclosed in the aforementioned U.S. Pat. No. 4,877,382 or U.S. Pat. No. 5,102,316, the disclosure of which is hereby incorporated herein by reference.

Figure 2:
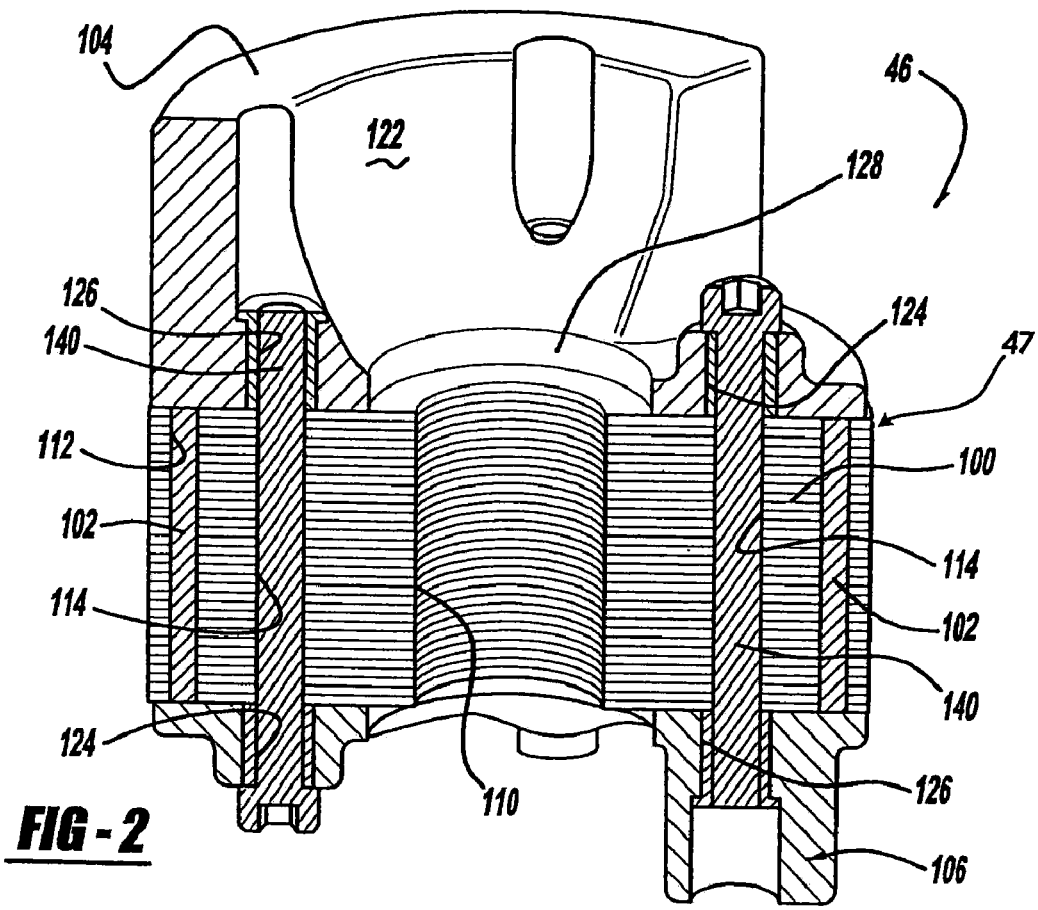
FIG. 2 is a cross-sectional perspective view of the BPM rotor assembly illustrated in FIG. 1.

Referring to FIG. 2, rotor assembly 46 comprises a rotor body 47 including a plurality of motor laminations 100 and a plurality of permanent magnets 102, an upper counterweight 104 and a lower counterweight 106. Upper and lower counterweights 104, 106 may generally form first and second counterweights of rotor assembly 46. Each motor lamination 100 defines a central bore 110, a plurality of magnet slots 112 and a plurality of bolt holes 114. The plurality of laminations 100 are stacked together as illustrated in FIG. 2 such that central bores 110 are in alignment, the plurality of magnet slots 112 are in alignment and the plurality of bolt holes 114 are in alignment.

Each of the plurality of permanent magnets 102 are disposed within a respective set of aligned magnet slots 112. At the time of assembly, the permanent magnets are in an "unmagnetized" state.

Figure 3:
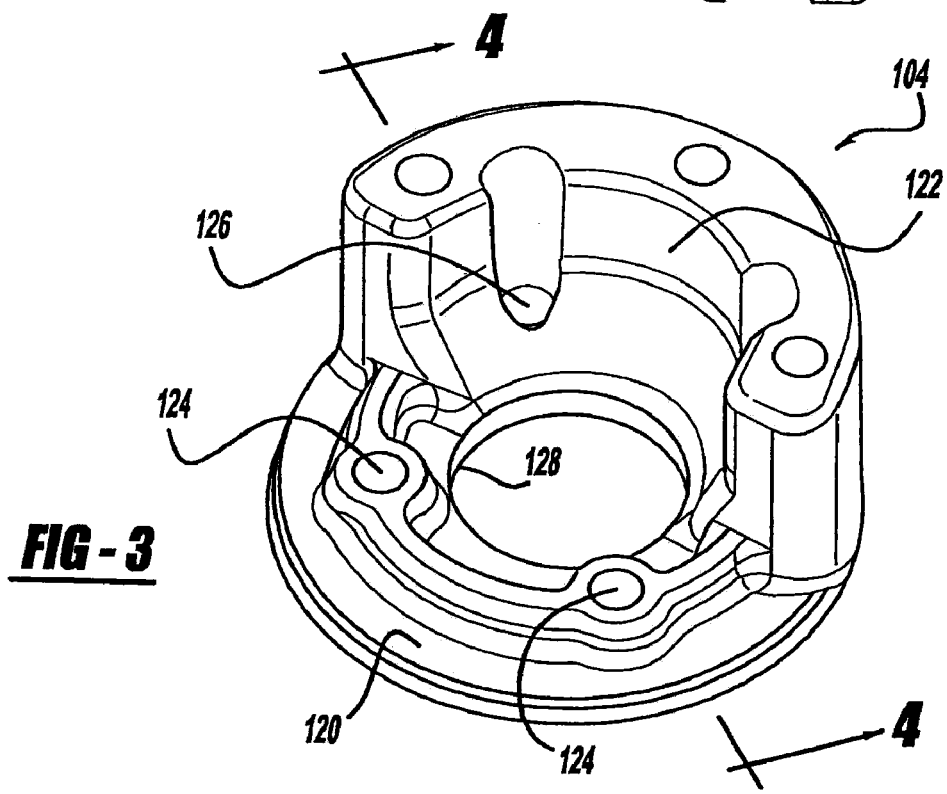
FIG. 3 is a perspective view of the upper counterweight illustrated in FIGS. 1 and 2.
Figure 4:
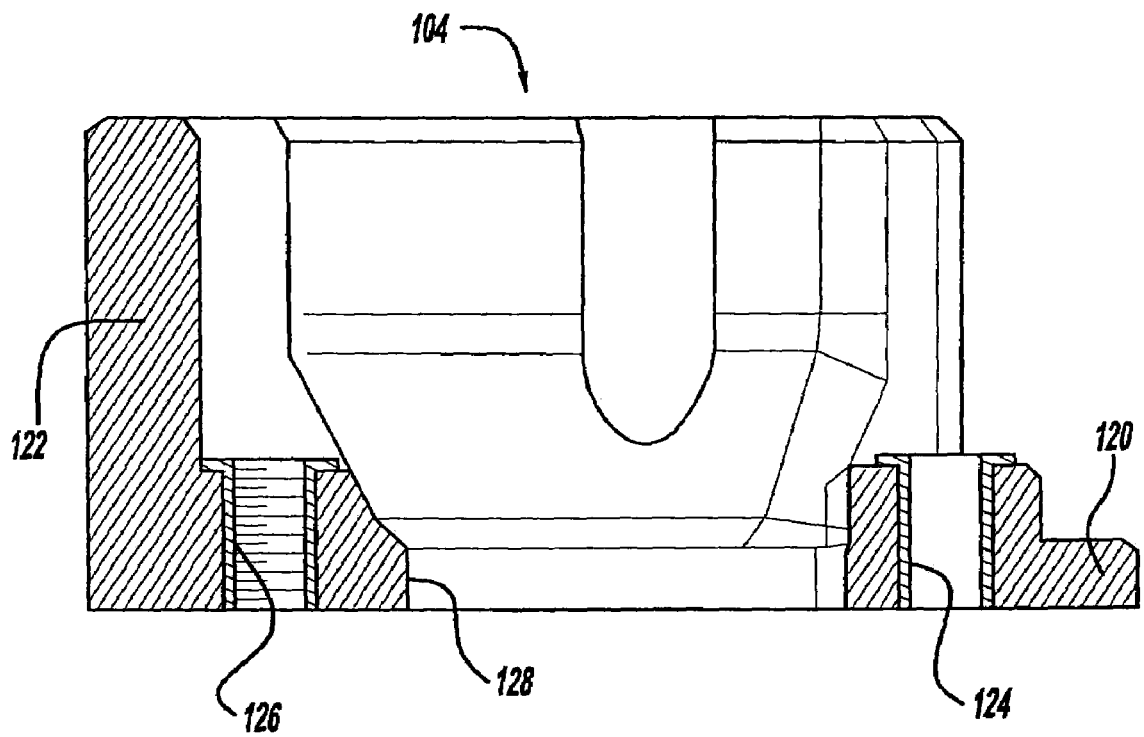
FIG. 4 is a cross-sectional view illustrating the counterweight illustrated in FIG. 3.

Referring to FIGS. 2-4, upper counterweight 104 comprises a relatively thin first circular base plate 120 and a mass 122 protruding from base plate 120. Base plate 120 defines a pair of inserts 124 having clearance holes and mass 122 defines a pair of inserts 126 having threaded bolt holes. The diameter of base plate 120 is designed to be approximately the same diameter as motor laminations 100. Inserts 124 and inserts 126 are cast into upper counterweight 104 and are spaced on upper counterweight 104 such that they each align with a respective bolt hole 114 in motor laminations 100. The size of mass 122 is selected such that it balances the scroll mass of compressor 10. A central bore 128 extends through upper counterweight 104.

Figure 5:
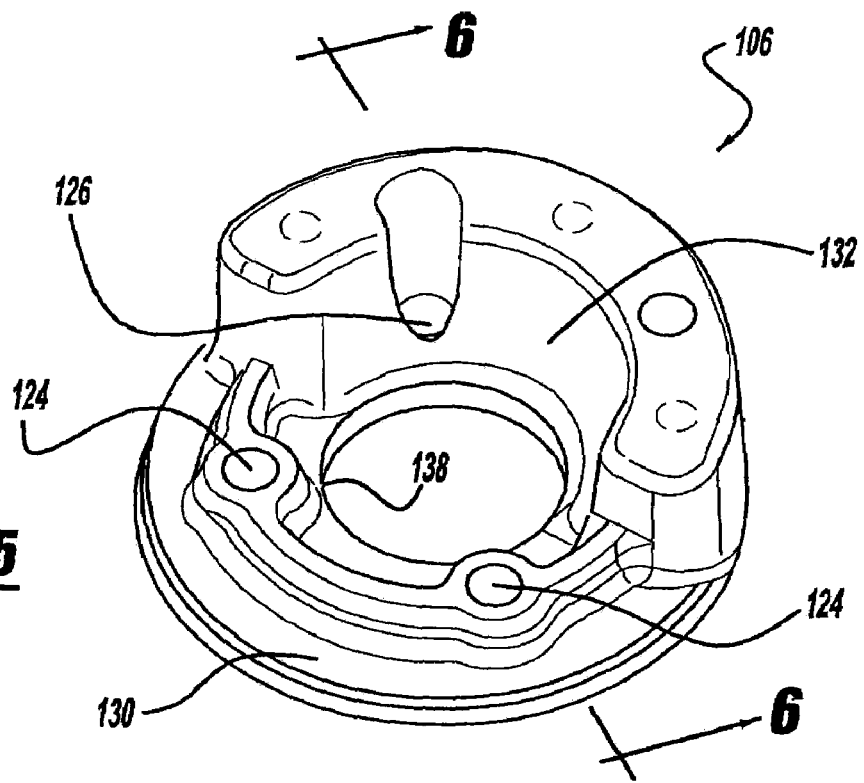
FIG. 5 is a perspective view of the lower counterweight illustrated in FIGS. 1 and 2.
Figure 6:
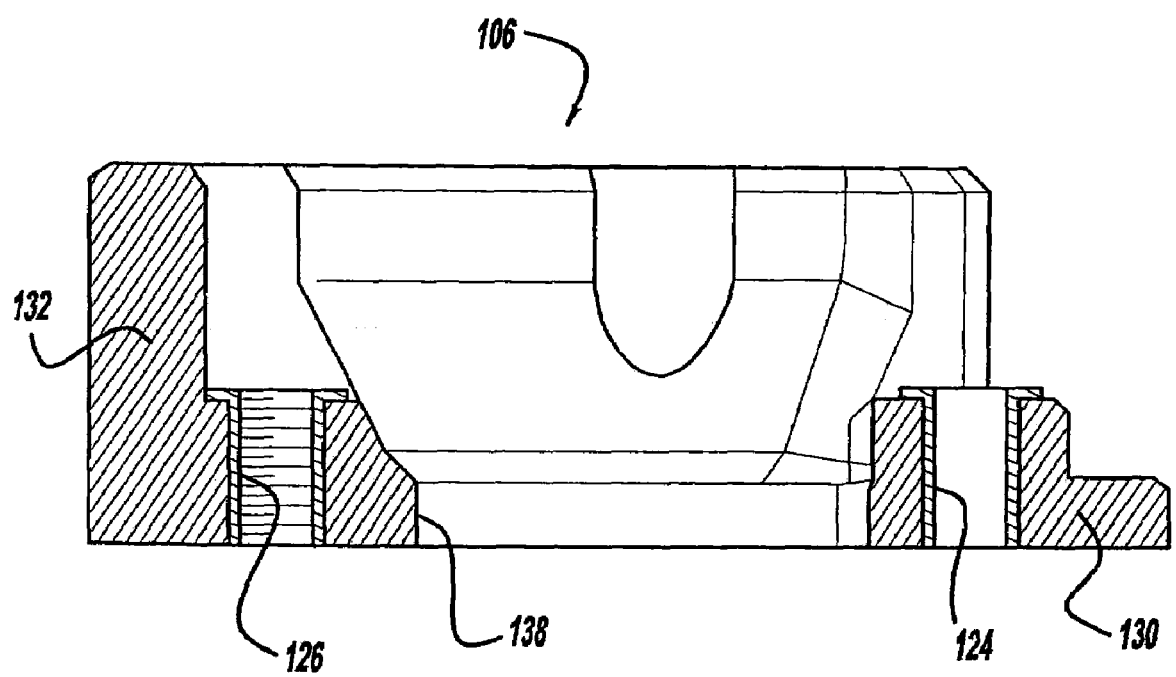
FIG. 6 is a cross-sectional view illustrating the counterweight illustrated in FIG. 5.

Referring to FIGS. 2, 5 and 6, lower counterweight 106 comprises a relatively thin second circular base plate 130 and a mass 132 protruding from base plate 130. Base plate 130 defines a pair of inserts 124 having clearance holes and mass 132 defines a pair of inserts 126 having threaded bolt holes. The diameter of base plate 130 is designed to be approximately the same diameter as motor laminations 100. Inserts 124 and inserts 126 are cast into lower counterweight 106 and are spaced on lower counterweight 106 such that they each align with a respective bolt hole 114 in motor laminations 100. The size of mass 132 is selected such that it balances the moment mass of compressor 10. A central bore 138 extends through lower counterweight 106.

Rotor assembly 46 is assembled by stacking the plurality laminations 100 such that central bores 110, magnet slots 112 and bolt holes 114 are in alignment. Upper counterweight 104 is assembled to one end of the stacked laminations 100 by aligning inserts 124 and inserts 126 with bolt holes 114. Lower counterweight 106 is assembled to the opposite end of the stacked laminations 100 by aligning inserts 124 and inserts 126 with bolt holes 114. Upper counterweight 104 is orientated with respect to lower counterweight 106 such that inserts 124 of upper counterweight 104 are aligned with inserts 126 of lower counterweight 106 and such that inserts 124 of lower counterweight 106 are aligned with inserts 126 of upper counterweight 104.

An attachment member in the form of a bolt 140 extends through each insert 124 of upper counterweight 104, through the aligned bolt holes 114 in laminations 100 and are threadingly received within a respective insert 126 of lower counterweight 106. A bolt 140 extends through each insert 124 of lower counterweight 106, through the aligned bolt holes 114 in lamination 100 and are threadingly received within a respective insert 126 of upper counterweight 104. All four bolts 140 are tightened to complete the assembly of rotor assembly 46. Rotor assembly 46 is then press fit onto crankshaft 30. Once assembled, base plates 120 and 130 secure permanent magnets 102 within magnet slots 112. While the present invention has been described as each counterweight 104 and 106 having two inserts 124 and two inserts 126, it is within the scope of the present invention to have one of counterweights 104 and 106 include four inserts 124 and the other counterweight include four inserts 126 and then have all four bolts 140 inserted through the counterweight having inserts 124 and threadingly received by the counter weight having inserts 126.

The present invention provides a cost effective method for building rotor assembly 46 and press fitting rotor assembly 46 to crankshaft 30. The present invention eliminates tight tolerances, costs and space associated with press fitting counterweights on crankshaft 30.

Upper counterweight 104 and lower counterweight 106 are illustrated with threaded inserts 126 and inserts 124 having clearance holes. Inserts 124 and 126 allow for the use of a low cost counterweight material such as zinc The incorporation of inserts 124 and 126 permit a metal to metal clamping for rotor assembly 46 with a steel connection being maintained through the assembly. A plurality of nuts (not shown) which are either recessed of flush with respect to counterweights 104 and 106 could replace inserts 126 if desired. The use of the plurality of nuts would still allow the use of the low cost counterweight material such as zinc.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A scroll machine comprising:
a first scroll member having a first end plate and a first spiral wrap projecting outwardly from said first end plate;
a second scroll member having a second end plate and a second spiral wrap projecting outwardly from said second end plate, said second scroll wrap being intermeshed with said first scroll wrap;
a crankshaft engaging one of said scroll members for causing said scroll members to orbit relative to one another whereby said spiral wraps will create pockets of progressively changing volume between a suction pressure zone and a discharge pressure zone; and
a rotor assembly attached to said crankshaft, said rotor assembly comprising:
a rotor body attached to said crankshaft;
a first counterweight disposed at a first end of said rotor body;
a second counterweight disposed at a second end of said rotor body;
an attachment member extending through said first counterweight, said second counterweight, and said rotor body, said attachment member engaged with said first and second counterweights to clamp said rotor body between said first and second counterweights.

2. The scroll machine according to claim 1 further comprising a first insert disposed within one of said first and second counterweights, said attachment member extending through a clearance hole defined by said first insert.

3. The scroll machine according to claim 2 further comprising a second insert disposed within the other of said first and second counterweights, said attachment member being threadingly received in a threaded bore defined by said second insert.

4. The scroll machine according to claim 1 wherein said rotor assembly further includes a permanent magnet disposed within said rotor body.

5. The scroll machine according to claim 4 further comprising a first insert disposed within one of said first and second counterweights, said attachment member extending through a clearance hole defined by said first insert.

6. The scroll machine according to claim 5 wherein said rotor body includes a plurality of motor laminations and each of said laminations defines a magnet slot, said permanent magnet being disposed within said magnet slots defined by said laminations.

7. The scroll machine according to claim 6 further comprising a second insert disposed within the other of said first and second counterweights, said attachment member being threadingly received in a threaded bore defined by said second insert.

8. The scroll machine according to claim 1 wherein said first counterweight includes a first circular base plate, said first circular base plate having a diameter generally equal to a diameter of said rotor body.

9. The scroll machine according to claim 8 wherein said second counterweight includes a second circular base plate, said second circular base plate having a diameter generally equal to the diameter of said rotor body.

10. The scroll machine according to claim 9 wherein said rotor assembly further includes a permanent magnet disposed within said rotor body.

11. The scroll machine according to claim 10 wherein said permanent magnet is retained within said rotor body by said first and second circular base plates.

12. The scroll machine according to claim 8 further comprising a first insert disposed within one of said first and second counterweights, said attachment member extending through a clearance hole defined by said first insert.

13. The scroll machine according to claim 12 further comprising a second insert disposed within the other of said first and second counterweights, said attachment member being threadingly received in a threaded bore defined by said second insert.

14. The scroll machine according to claim 1 further comprising an insert disposed within one of said first and second counterweights, said attachment member being threadingly received in a threaded bore defined by said insert.

15. A rotor assembly comprising:
a rotor body attached to a crankshaft;
a first counterweight disposed at a first end of said rotor body;
a second counterweight disposed at a second end of said rotor body;
an attachment member extending through said first counterweight, said second counterweight, and said rotor body, said attachment member engaged with said first and second counterweights to clamp said rotor body between said first and second counterweights.

16. The rotor assembly according to claim 15 further comprising a first insert disposed within one of said first and second counterweights, said attachment member extending through a clearance hole defined by said first insert.

17. The rotor assembly according to claim 16 further comprising a second insert disposed within the other of said first and second counterweights, said attachment member being threadingly received in a threaded bore defined by said second insert.

18. The rotor assembly according to claim 15 wherein said rotor assembly further includes a permanent magnet disposed within said rotor body.

19. The rotor assembly according to claim 18 further comprising a first insert disposed within one of said first and second counterweights, said attachment member extending through a clearance hole defined by said first insert.

20. The rotor assembly according to claim 19 wherein each of said laminations defines a magnet slot, said permanent magnet being disposed within said magnet slots defined by said laminations.

21. The rotor assembly according to claim 20 further comprising a second insert disposed within the other of said first and second counterweights, said attachment member being threadingly received in a threaded bore defined by said second insert.

22. The rotor assembly according to claim 15 wherein said first counterweight includes a first circular base plate, said first circular base plate having a diameter generally equal to a diameter of said rotor body.

23. The rotor assembly according to claim 22 wherein said second counterweight includes a second circular base plate, said second circular base plate having a diameter generally equal to the diameter of said rotor body.

24. The rotor assembly according to claim 23 wherein said rotor assembly further includes a permanent magnet disposed within said rotor body.

25. The rotor assembly according to claim 24 wherein said permanent magnet is retained within said rotor body by said first and second circular base plates.

26. The rotor assembly according to claim 22 further comprising a first insert disposed within one of said first and second counterweights, said attachment member extending through a clearance hole defined by said first insert.

27. The rotor assembly according to claim 26 further comprising a second insert disposed within the other of said first and second counterweights, said attachment member being threadingly received in a threaded bore defined by said second insert.

28. The scroll machine according to claim 15 further comprising an insert disposed within one of said first and second counterweights, said attachment member being threadingly received in a threaded bore defined by said insert.

* * * * *